June 11, 1946.    E. K. JOHANSEN    2,402,052
CLUTCH AND BRAKE MECHANISM
Filed May 24, 1943    3 Sheets-Sheet 1
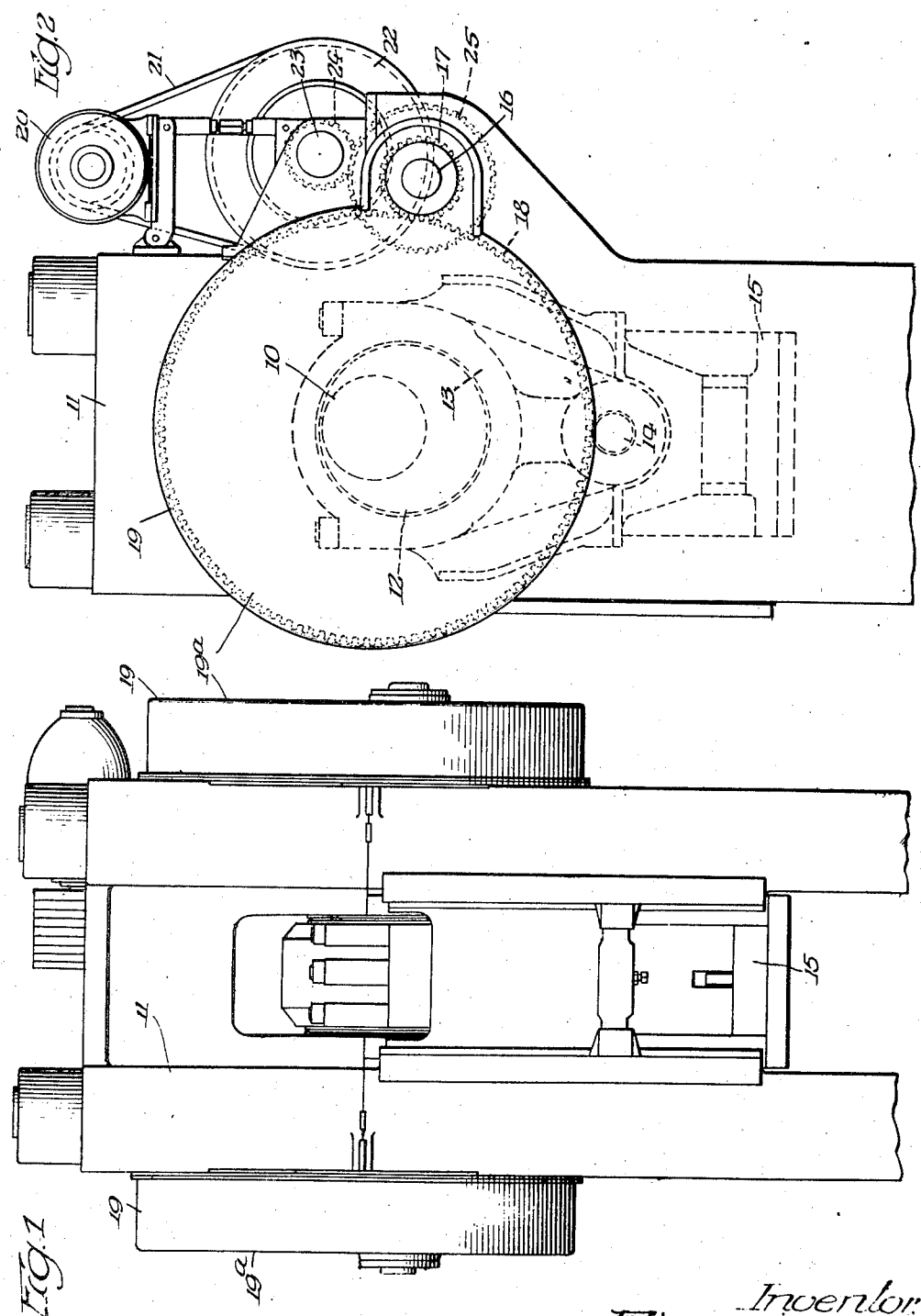
Inventor
Einar K. Johansen
By June 11, 1946.     E. K. JOHANSEN     2,402,052
CLUTCH AND BRAKE MECHANISM
Filed May 24, 1943     3 Sheets-Sheet 2
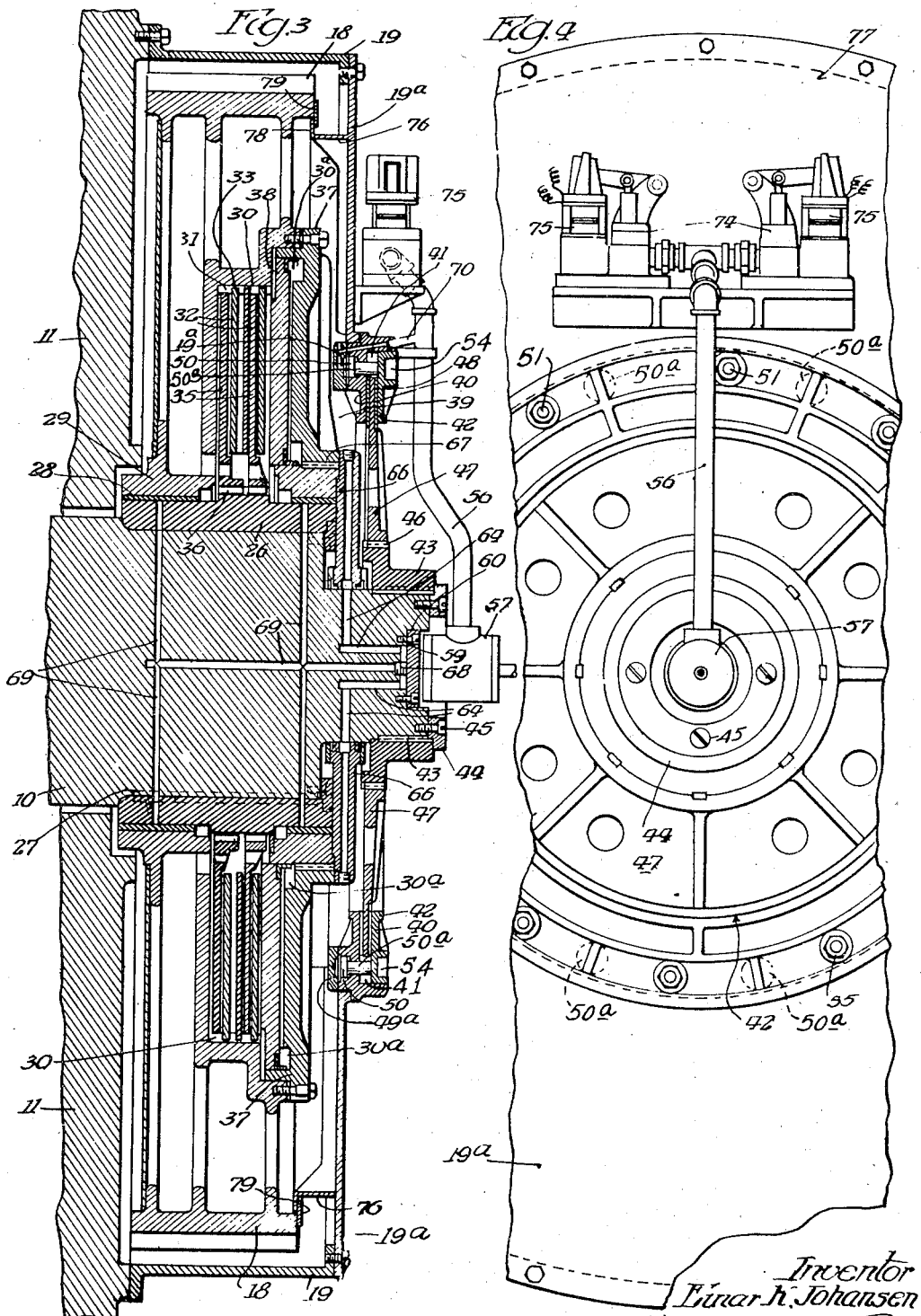
Inventor
Einar K. Johansen

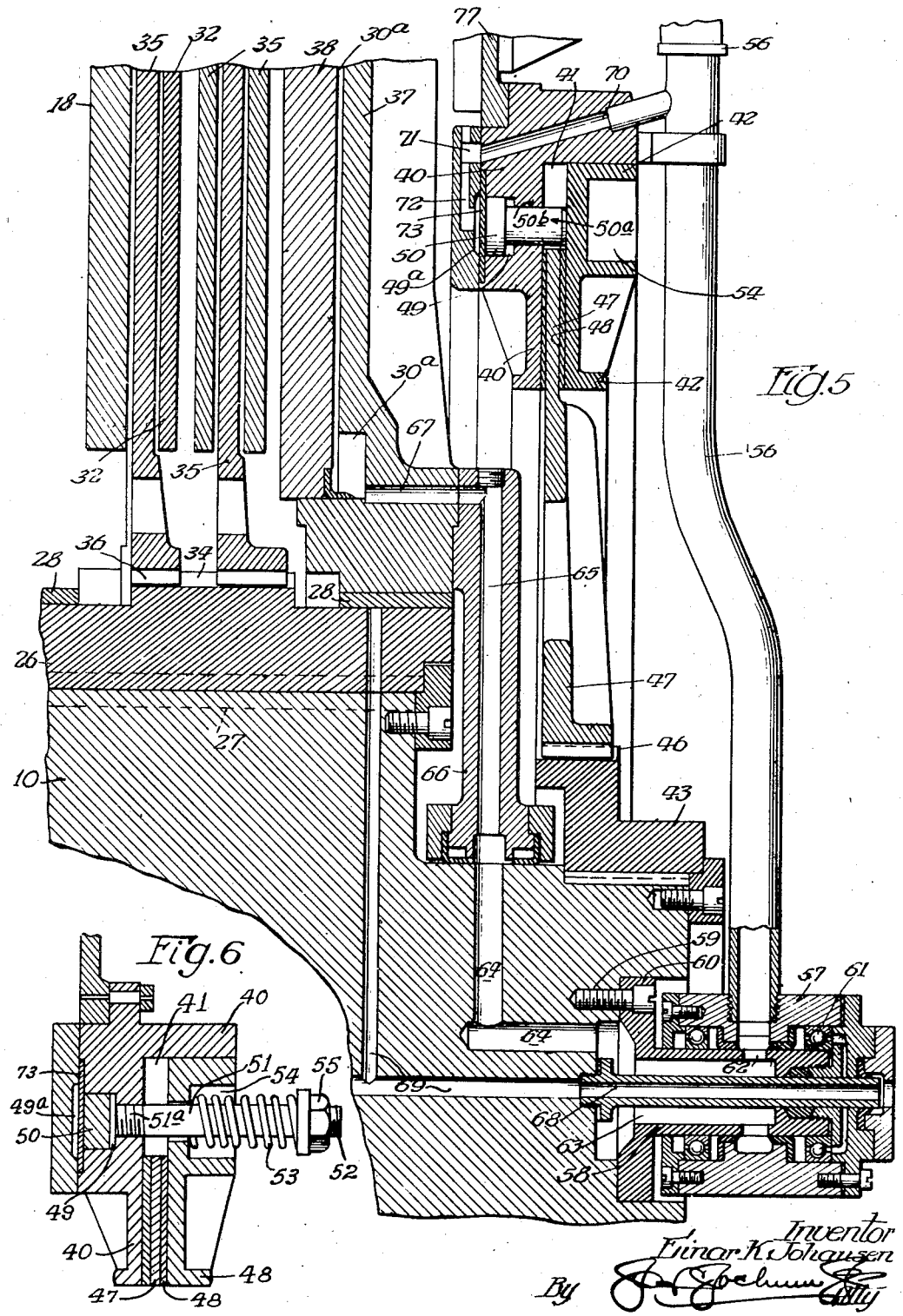

Patented June 11, 1946

2,402,052

UNITED STATES PATENT OFFICE 2,402,052

CLUTCH AND BRAKE MECHANISM

Einar K. Johansen, Chicago, Ill., assignor to Clearing Machine Corporation, Chicago, Ill., a corporation of Illinois Application May 24, 1943, Serial No. 488,192

4 Claims. (Cl. 192—18)

This invention relates to improvements in clutch and brake mechanism, particularly adapted, though not necessarily limited in use, for large and heavy presses operating at high speed.

Heretofore, with presses of this character, it has been customary to arrange or mount the controlling clutch upon the power driving shaft of the press, with the result that when starting the press, it is necessary to start to rotate, or actuate, all of the movable parts, which constitute a very heavy mass, and this requires considerable power, with a resultant strain upon the clutch mechanism.

It is one of the objects of the present invention to overcome these objections and difficulties, and to provide an improved clutch mechanism which is mounted upon the crank shaft, that is, the shaft which directly imparts motion to the slides of the press, with the result that only the driving mechanism will be initially started in operation. Subsequently thereto, and at the will of the operator, the clutch may be rendered active to transmit such motion to the crank shaft, thereby reducing materially not only strain upon the clutch, but also the volume or mass to be initially moved upon starting of the operation of the press.

Heretofore, with presses of this character, it has also been customary to provide the clutching and braking mechanism at opposite ends of the power shaft. In the present invention there is provided a clutch and brake mechanism connected with the crank shaft, both at the same end of the shaft. Furthermore, with the present invention there may be provided both a clutch and brake at both ends of the crank shaft. Such an arrangement, according to the principles of the present invention, permits of the use of smaller clutches and brakes, and reduces very materially the kinetic energy which must be started for each operation of the slides of the press.

To the attainment of these ends and the accomplishment of other new and useful objects as will appear, the invention consists in the features of novelty in substantially the construction, combination and arrangement of the several parts hereinafter more fully described and claimed, and shown in the accompanying drawings illustrating this invention, in which:

Fig. 1 is a front elevation of a portion of a press having clutch and brake mechanism applied thereto, constructed in accordance with the principles of this invention.

Fig. 2 is a side elevation of Fig. 1.

Fig. 3 is a vertical sectional view of one end of a crank shaft and a part of a press frame, showing clutch and brake mechanism and the means for releasing the brake, constructed in accordance with the principles of this invention, applied to the crank shaft.

Fig. 4 is a right-hand elevation of Fig. 3, with parts omitted.

Fig. 5 is an enlarged detail sectional view of a portion of the clutch and brake mechanism at one end of the crank shaft showing the spring means for rendering the clutch mechanism inactive.

Fig. 6 is a detail sectional view taken through the spring means for rendering the brake mechanism active and the clutch mechanism inactive.

Throughout this specification and claims, the shaft to which the clutch is connected, or upon which it is mounted, will be designated as a crank shaft, but it is to be understood that such term is not to be considered as a term of limitation, but is to be construed broadly to include either a shaft having a crank portion or a shaft having an eccentric (as shown) connected therewith and provided with a co-operating eccentric strap, which latter forms the connection with the slide of the press.

Referring more specifically to the drawings, the numeral 10 designates a main operating shaft, which may be a crank or an eccentric shaft and is mounted in the frame 11 of the press. Carried by the shaft is one or more eccentrics 12, according to the nature of the press, that is, according to the number of slides which are to be operated by the rotation of the crank shaft. Co-operating with each of the eccentrics 12 is an eccentric strap 13 which has a pivotal connection 14 with the slide 15, so that upon rotation of the shaft, the slide will be given a reciprocatory movement.

The numeral 16 designates a driving shaft which carries gears 17 that mesh with gears 18, one of the gears 18 being located on each side of the press and encased within a housing 19, each housing being supported by the frame. Motion is imparted to the gear 18 to rotate the latter in any suitable manner, such as from a motor 20 which may be connected by a belt 21 with a pulley 22, the latter being secured to a shaft 23. This shaft 23 is provided with a gear 24 that meshes with a gear 25 that is also connected to the shaft 16, for the purpose of transmitting a rotary motion to the gear 18.

As before stated, one of these clutch and brake mechanisms may be arranged at each end of the crank shaft 10, and therefore the description of one will apply equally as well to both of them. The shaft 10 carries a sleeve member 26 which is secured thereto and for rotation therewith, in any suitable manner, such as by means of a gib or key 27. The gear 18 is rotatable upon the sleeve 26, and, if desired, suitable bearing material 28 may be provided between the hub 29 of the gear 18 and the sleeve 26. The gear 18 is provided with a chamber 30 disposed at its center, and the wall of the chamber is provided with any suitable number of ribs or teeth 31 projecting inwardly.

Arranged within the chamber 30 are annular friction creating members 32, any number of which may be provided, and these members 32 are provided with teeth or recesses 33, each interengaged with the teeth or ribs 31 on the wall of the chamber 30, so that the friction creating elements 32 may rotate with the gear 18, and are also adapted for lateral bodily movements in directions lengthwise of the axis of the gear. The sleeve 26 is also provided, about its periphery, with teeth or ribs 34, any number of which may be provided, and annular friction creating elements 35 are mounted upon the sleeve 26 and are themselves provided with teeth or ribs 36 engaging or intermeshing with the teeth or ribs 34 on the sleeve 26, so that these elements 35 will rotate with the sleeve 26 and are also adapted for lateral movement in directions lengthwise of the axis of the shaft 10.

The friction creating elements 32—35 are alternately arranged with respect to each other, and friction creating material may be provided on the proximate faces of adjacent discs, so as to create the necessary friction to cause all of these elements to rotate together, and to frictionally lock the gear 18 with respect to the shaft 10.

A chamber 30ª (or a plurality of separate and communicating chambers) in the gear 18 is, or may be, provided with a removable closure 37, and is of such a size that a piston 38 disposed therein is adapted for lateral movement. Fluid pressure, which is admitted into the chamber 30ª, in a manner hereinafter to be described, will act upon the piston 38 to move it laterally and to force the friction elements 35—32 into engagement with each other, so as to lock the gear 18 and the shaft 10 for rotation together. When, however, the fluid pressure in the chamber 30ª behind the piston 38 is reduced, then the discs or elements 35—32 will be free to rotate, one with respect to the other, so that the gear 18 will then be unlocked from the shaft 10 to permit the gear to rotate independently with respect to the shaft.

The front wall 19ª of the housing 19 is provided with an opening 39 through which the end of the shaft 10 projects, and secured to the wall 19ª and also encompassing the shaft 10 is an annular member 40, and this annular member is provided with a chamber 41 closed by a closure plate 42.

Mounted upon the shaft 10 is a sleeve or collar 43 which is secured to the shaft for rotation therewith, and may be held in position in any suitable manner, such as by means of a key and an annular member 44 secured in position and to the shaft 10 by means of suitable fastening devices 45. This member 43 is provided with annular teeth or ribs 46 which are extended to any desired extent in a direction lengthwise of the axis of the member 43. A friction creating member 47 is slidable upon the annular member 43, and is provided with teeth or recesses encompassing the inner periphery thereof, which interengage or intermesh with the teeth 46, so that the member 47 may be given a sliding movement in a direction lengthwise of the axis of the member 43. This member 47 projects into the space between the member 40 of the chamber 41 and the closure plate 42, and friction creating material 48 may be provided on the proximate faces of the adjacent parts.

The member 40 is provided with a chamber 49 in which is arranged a piston 50, and this piston may be either an annular member to conform to the contour of the chamber 49, or may be in the form of a plurality of separate pistons. A plurality of studs or members 51 are secured or anchored to the member 40, as at 51ª, and pass loosely through the plate 42, as shown more clearly in Fig. 6. Encompassing each of these studs is a coiled spring 53, one end of which engages the member 42, preferably being seated in a recess 54. The other end of the spring contacts an adjustable nut or collar 55 on the threaded extremity 52 of the respective stud 51. The spring 53 tends normally to force the member 42 in a direction to create enough friction between the members 40 and 42 to lock the shaft 10 normally against rotation.

Disposed intermediate the member 42 and the piston 50, and also between the respective studs or members 51, is a series of pins or members 50ª, that are mounted to slide freely in openings or bearings 50ᵇ in the member 40. These pins or members may be connected to, or may be separate from, the piston 50, and are of a length to engage the member 42. Any number of these pins or members 50ª, and of the studs 51, may be employed, and may be arranged in any suitable manner with respect to each other. The pins or members 50ª serve as a means for moving the member 42 in one direction against the stress of the springs 53, and they also serve as a means for forcing back the piston 50.

When fluid pressure is admitted into the chamber 49ª, in a manner to be presently described, the piston 50 will be moved to the right in Figs. 5 and 6, and cause the pins 50ª to move the brake member 42 against the stress of the springs 53, to release it, thereby rendering the brake inoperative. When the fluid pressure is exhausted through the chamber 71, and the passage 70, the springs 53 will act upon the disc or member 42, and return it to its original position; that is, to render the brake active. The piston 50 will, at the same time, be forced back to its original position by the pins 50ª, as the pins will then be moved or shifted by the brake member 42. The elements 40—47—42 being released with respect to each other, permits the shaft 10 to rotate with the gear wheel 18, when the latter is locked to the shaft. When the brake formed by the elements 40—47—42 is active to lock the shaft 10 against rotation, the clutch mechanism embodying the elements 32—35—38 will be inactive, so as to unlock the gear 18 with respect to the shaft 10.

Fluid pressure for controlling these parts may be supplied from any suitable source and delivered into a supply pipe 56, which latter has communication with a casing 57 that is held stationary with respect to the shaft 10. Within the casing 57 is a tubular member 58 that is secured to the shaft 10 in any suitable manner, preferably by means of suitable fastening devices 59 passing through a hub 60. This tubular member 58 is preferably rotatably supported by means of ball bearings 61, and has an opening 62 for the admission of fluid pressure from the pipe 56.

A chamber 63 in the tubular member 58 has communication with a passage 64 in the shaft 10, and this passage 64 has communication with a passage 65 in a member 66 supported for rotation with the shaft 10. This passage 65, in turn, has communication with a passage 67 leading to the chamber 30ª in the gear wheel 18 behind the piston 38. With this construction, and when the fluid pressure flows from the pipe 56 through the opening 62, thence through the passages 64—66—67, it will enter the chamber 30ª behind the piston 38 to move the latter laterally, to effect a clamping action of the elements 32—35.

A tubular bearing 68 passes through the casing 57 and has communication with the passages 69, by means of which the bearing for the gear and between the gear and the shaft 10 may be lubricated. Leading from the pipe 56 is a branch pipe 70 having communication with a chamber 71 which has communication, by means of a passage 72, with the chamber 49ª in which the piston or pistons is or are located. If desired, a diaphragm 73 may be provided, against which the pistons 50 rest. With this construction, when fluid pressure is admitted into the pipe 56, a portion of the fluid will flow through the branch pipe 70 into the chamber 71, and thence through the passage 72, to act upon the diaphragm 73; or, if desired, separate diaphragms for the pistons 50 may be provided, to force the diaphragm 73 against the pistons 50 to overcome the stress of the springs 53, to release the brake formed by the elements 40—47—42. The operation of the clutch formed by the elements 32—35 is in opposition to the brake formed by the elements 40—47—42; that is, when one is active, the other is rendered inactive.

The fluid pressure is supplied from any suitable source, and in order to control the same, a suitable valve mechanism 74 may be provided, one for each of the mechanisms at the different ends of the shaft 10. This valve mechanism may be of any desired or suitable construction well known in this art, the specific construction and the operation of which form no part of the present invention. Suffice it to say, however, that each of the valves 74 is adapted to be actuated by means of a suitable electro-responsive device, in the form of solenoids or other suitable devices, which will be rendered active or inactive by means of suitable push buttons suitably arranged in a position convenient for the operator, so that by operating the buttons the gear 18 may be locked or unlocked with respect to the shaft 10. Obviously, suitable packing will be provided at all points necessary to prevent leakage.

If desired, there may be provided an annular flange 76 on the front wall 19ª of the housing 19, which flange projects inwardly, as shown more clearly in Fig. 3, and may be provided with an upwardly projecting annular wall 78. A plate or member 79 may be secured to the gear 18 to overlap the wall 78 and thereby provide a seal to prevent the lubricating material from being dissipated by the rotation of the gear 18.

It is thought that the operation of this mechanism will be clearly understood from the foregoing, but, briefly stated, it is as follows:

When the press is idle, the gear 18 will be unlocked with respect to the shaft 10, as at that time fluid under pressure will not be acting upon the piston 38, and the friction creating elements 32—35 will be free to rotate, one with respect to the other. The springs 53 will, at that time, move the member 42 inwardly, to render the brake active, and thereby lock the shaft 10 against rotation.

To start the press, the motor is operated, which will transmit a rotary motion to the gear 18, but as the gear 18 is unlocked with respect to the shaft 10, the shaft will remain idle and against rotation, by reason of the fact that the brake is active and will hold the shaft against rotation. After the desired speed has been given to the gear 18, or after the gear 18 is rotated, fluid pressure is admitted into the pipe 56, and being first admitted through the branch pipe 70, the brake will be rendered inactive by moving the pistons 50 under fluid pressure against the stress of the springs 53. The fluid pressure in the pipe 56 will then shift the piston 38 in the chamber 30ª, to render the clutch active to lock the gear 18 with respect to the shaft 10. Thereafter, the gear 18 will rotate the shaft 10 until the fluid pressure is released, at which time the brake will then become active to stop and lock the shaft 10 against rotation, and the gear 18 will become unlocked from the shaft 10, and will be free to rotate about the shaft 10.

With this construction, the fluid pressure will not only be supplied directly to operate the brake and clutch mechanism, but they will be operated simultaneously. Further, the operation of the clutch mechanism will not depend upon or be controlled by the operation of any of the parts of the brake mechanism.

It will be manifest that in starting the press, considerable power is conserved and less kinetic energy will be required to start the press, because the gear 18 will be started to rotate under the power applied, without rotating the shaft 10. It is not until after the gear and all of the driving mechanism have been started in their rotation that the shaft 10 will be connected to the gear.

In the specification and claims, the clutch and brake mechanisms are described in connection with a gear 18, but it is to be understood that the mechanisms are also applicable to a fly wheel. Therefore, when the term "gear" is employed, especially in the claims, such term is to be considered broadly to include either a gear or a fly wheel.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In a press, clutch and brake mechanism embodying a main shaft, a gear mounted upon the shaft for driving it, a clutch and a brake mechanism adjacent the gear, one part of the clutch being mounted upon said shaft and another part being mounted upon said gear, the entire clutch mechanism being located within the confines of the lateral faces of the gear, a stationary casing or hood enclosing said gear and the said clutch mechanism, a portion of said brake mechanism being secured to said casing, said clutch embodying clutch discs normally in disengaging relationship, said brake embodying disc elements, resilient means normally holding said brake elements in locking relationship, and fluid pressure means operable against the pressure of said resilient means, to cause the brake elements to move into inactive relationship, the braking action being responsive to the action of said resilient means.

2. In a press, clutch and brake mechanism embodying a main shaft, a gear mounted upon the shaft for driving it, a clutch and a brake mechanism adjacent the gear, one part of the clutch being mounted upon said shaft and another part being mounted upon said gear, the entire clutch mechanism being located within the confines of the lateral faces of the gear, a stationary casing or hood enclosing said gear and the said clutch mechanism, a portion of said brake mechanism being secured to said casing, said clutch embodying clutch discs normally in disengaging relationship, said brake embodying disc elements, resilient means normally holding said brake elements in locking relationship, and fluid pressure means operable against the pressure of said resilient means, to cause the brake elements to move into inactive relationship, and to also render the clutch mechanism active, the said fluid pressure means embodying cylinder and piston elements rotatable with said shaft.

3. In a press, clutch and brake mechanism embodying a main shaft, a gear mounted upon the shaft for driving it, a clutch and a brake mechanism adjacent the gear, one part of the clutch being mounted upon said shaft and another part being mounted upon said gear, the entire clutch mechanism being located within the confines of the lateral faces of the gear, a stationary casing or hood enclosing said gear and the said clutch mechanism, a portion of said brake mechanism being secured to said casing, said clutch embodying clutch discs normally in disengaging relationship, said brake embodying disc elements, resilient means normally holding said brake elements in locking relationship, and fluid pressure means operable against the pressure of said resilient means, to cause the clutch elements to move into inactive relationship, and to also render the clutch mechanism active, the said fluid pressure means embodying a plurality of separate piston elements for rendering the brake mechanism inactive.

4. In a press, clutch and brake mechanism embodying a main shaft, a gear mounted upon the shaft for driving it, a clutch and brake mechanism adjacent the gear, one part of the clutch being mounted upon said shaft and another part being mounted upon said gear, the entire clutch mechanism being located within the confines of the lateral faces of the gear, a portion of said brake mechanism being secured to a fixed support, and embodying disc elements, resilient means normally acting upon one of the brake elements for holding it in active relationship with another brake element, fluid pressure means for rendering said brake mechanism inactive and said clutch mechanism active, the last recited means embodying a piston element, and a member operable by said piston element and engaging one of the brake elements for moving the latter against the stress of said resilient means.

EINAR K. JOHANSEN.